(12) United States Patent
Elisha et al.

(10) Patent No.: US 10,019,514 B2
(45) Date of Patent: Jul. 10, 2018

(54) SYSTEM AND METHOD FOR PHONETIC SEARCH OVER SPEECH RECORDINGS

(71) Applicant: NICE-SYSTEMS LTD., Ra'anana (IL)

(72) Inventors: Oren Elisha, Tel-Aviv (IL); Merav Ben-Asher, Binyamina (IL)

(73) Assignee: NICE LTD., Ra'anana (IL)

( * ) Notice: Subject to any disclaimer, the term of this patent is extended or adjusted under 35 U.S.C. 154(b) by 329 days.

(21) Appl. No.: 14/934,467

(22) Filed: Nov. 6, 2015

(65) Prior Publication Data

US 2016/0275945 A1 Sep. 22, 2016

Related U.S. Application Data

(60) Provisional application No. 62/135,311, filed on Mar. 19, 2015.

(51) Int. Cl.
| | |
|---|---|
| *G06F 17/30* | (2006.01) |
| *G10L 15/02* | (2006.01) |
| *G10L 15/26* | (2006.01) |
| *G10L 25/54* | (2013.01) |

(52) U.S. Cl.
CPC .. *G06F 17/30684* (2013.01); *G06F 17/30746* (2013.01); *G06F 17/30755* (2013.01); *G10L 25/54* (2013.01); *G10L 15/26* (2013.01); *G10L 2015/025* (2013.01)

(58) Field of Classification Search
None
See application file for complete search history.

(56) References Cited

U.S. PATENT DOCUMENTS

| | | | | |
|---|---|---|---|---|
| 5,870,755 | A * | 2/1999 | Stevens | G06F 17/30796 |
| 6,026,398 | A * | 2/2000 | Brown | G06F 17/30622 704/1 |
| 6,345,252 | B1 * | 2/2002 | Beigi | G06F 17/30746 704/251 |
| 6,397,181 | B1 * | 5/2002 | Li | G10L 15/08 704/256.4 |
| 8,214,210 | B1 * | 7/2012 | Woods | G10L 15/08 704/10 |
| 8,521,526 | B1 * | 8/2013 | Lloyd | G10L 15/197 704/236 |
| 8,831,946 | B2 | 9/2014 | Mamou | |

(Continued)

OTHER PUBLICATIONS

Mamou et al. "Proceedings of the 30th annual international ACM SIGIR conference on Research and development in information retrieval" SIGIR'07, Jul. 23-27, 2007.

*Primary Examiner* — Eric Yen
(74) *Attorney, Agent, or Firm* — Pearl Cohen Zedek Latzer Baratz LLP

(57) ABSTRACT

A system and method for searching for an element in speech related documents may include transcribing a set of speech recordings to a set of phoneme strings and including the phoneme strings in a set of phonetic transcriptions. A system and method may reverse-index the phonetic transcriptions according to one or more phonemes such that the one or more phonemes can be used as a search key for searching the phoneme in the phonetic transcriptions. A system and method may transcribe a textual search term into a set of search phoneme strings and use the set of search phoneme strings to search for an element in the set of phonetic transcriptions.

20 Claims, 5 Drawing Sheets

(56) References Cited

U.S. PATENT DOCUMENTS

| | | | | |
|---|---|---|---|---|
| 2003/0110451 A1* | 6/2003 | Wen | ................... | G06F 17/2863 |
| | | | | 715/265 |
| 2003/0187642 A1* | 10/2003 | Ponceleon | .......... | G10L 15/1822 |
| | | | | 704/252 |
| 2006/0004721 A1* | 1/2006 | Bedworth | ......... | G06F 17/30327 |
| 2007/0011012 A1* | 1/2007 | Yurick | ................... | G10L 15/26 |
| | | | | 704/277 |
| 2007/0133518 A1* | 6/2007 | Ben-David | ............. | G10L 15/30 |
| | | | | 370/352 |
| 2007/0288237 A1* | 12/2007 | Wu | ........................ | G10L 21/06 |
| | | | | 704/235 |
| 2008/0270110 A1* | 10/2008 | Yurick | .............. | G06F 17/30026 |
| | | | | 704/3 |
| 2009/0030680 A1* | 1/2009 | Mamou | ............ | G06F 17/30746 |
| | | | | 704/235 |
| 2009/0030894 A1* | 1/2009 | Mamou | ............ | G06F 17/30681 |
| 2010/0121642 A1* | 5/2010 | Hori | ................... | G06F 17/3074 |
| | | | | 704/254 |
| 2013/0006629 A1* | 1/2013 | Honda | .............. | G06F 17/30681 |
| | | | | 704/236 |
| 2014/0067373 A1* | 3/2014 | Wasserblat | .............. | G10L 15/02 |
| | | | | 704/9 |

\* cited by examiner

| SYSTEM | LEXICON | PRECISION [%] | RECALL [%] | RETRIEVAL TIME [SEC] | OOV SOLUTION |
|---|---|---|---|---|---|
| SOLR_LVCSR | LONG PHRASES | 85 | 75 | 0.114 | NO |
| | MEDIUM PHRASES | 81 | 78 | 0.107 | NO |
| STANDARD_SEARCH | LONG PHRASES | 81 | 76 | 70.021 | YES |
| | MEDIUM PHRASES | 82 | 54 | 68.554 | YES |
| SOLR_FUZZY 1 SINGLE PHONEME INDEXING | LONG PHRASES | 90 | 15 | 7.040 | YES |
| | MEDIUM PHRASES | 82 | 24 | 5.250 | YES |
| SOLR_PERMUTATION SINGLE PHONEME INDEXING | LONG PHRASES | 85 | 21 | 10.621 | YES |
| | MEDIUM PHRASES | 82 | 27 | 7.808 | YES |
| SOLR_FUZZY 2 K-PHONEME INDEXING | LONG PHRASES | 97 | 7 | 0.110 | YES |
| | MEDIUM PHRASES | 89 | 20 | 0.104 | YES |

FIG. 6

SYSTEM AND METHOD FOR PHONETIC SEARCH OVER SPEECH RECORDINGS

CROSS-REFERENCE TO RELATED APPLICATIONS

This application claims the benefit of U.S. Provisional Patent Application No. 62/135,311, filed on Mar. 19, 2015, that is owned by the assignee of the instant application and which is incorporated in its entirety herein by reference.

FIELD OF THE INVENTION

The present invention relates generally to searching for textual elements in audio recorded content. More specifically, the present invention relates to using a fast phonetic search in conversational speech recordings using a search platform or server.

BACKGROUND OF THE INVENTION

Spoken document retrieval (SDR) systems can be used for searching and filtering large datasets of speech recordings. Generally, an element (e.g., word, phrase or sentence) is searched by searching for a textual element in a transcription of an audio content. A common platform for SDR systems is the Solr platform (see https://en.wikipedia.org/wiki/Apache_Solr) which can enable a fast search over large amounts of textual data. Known systems and method can transcribe an audio recording using large vocabulary speech recognition (LVCSR) to produce, for example, a transcription of the audio recording and/or search for an element in the transcription.

However, using an LVCSR can have a number of drawbacks. For example, LVCSR systems can be unable to detect and/or transcribe Out Of Vocabulary (OOV) words or phrases. Generally, if a word is not present in the LVCSR's vocabulary, an LVCSR based system or method misrecognizes the word resulting in, for example, user requests and queries related to the word failing. Generally, a user's query or request includes requesting to search for an element or term in a set of audio recordings or transcriptions thereof.

Unfortunately, OOV words are often the basis of, or included in, user queries or requests. For example, requests related to customer service or market management, in which new products, new rival companies and/or other name entities might be the user's main interest. Names of new products or new companies may not yet be included in an LVCSR's vocabulary and may therefore cause OOV errors.

Moreover, transcribing large amounts of audio content (e.g., conversations or phone calls) to text can require costly computational resources and/or be time consuming. For example, due to the costly transcription process, known systems may only transcribe a portion of the relevant audio content (e.g., 30%) and therefore fail to cover (or search in) all relevant audio content, e.g., all customers phone calls.

SUMMARY OF THE INVENTION

A system and method of searching for an element in speech related documents may include transcribing a set of digital (or digitized) speech recordings to a set of phoneme strings and including the phoneme strings in a set of phonetic transcriptions; revers-indexing the phonetic transcriptions according to one or more phonemes such that the one or more phonemes can be used as a search key for searching the phoneme in the phonetic transcriptions; transcribing a textual search term into a set of search phoneme strings; and using the set of search phoneme strings to search for an element in the set of phonetic transcriptions. A system and method may, prior to indexing phonetic transcriptions, perform at least one of: removing a phoneme string from the set of phonetic transcriptions and replacing a phoneme string in the set of phonetic transcriptions.

A system and method may produce N-Best phonetic transcriptions based on an input speech recording; and inverse index the N-Best phonetic transcriptions to produce a set of N phonetic transcriptions searchable using the textual search term. A system and method may divide a set of set of phonetic transcriptions into a number of short sub-documents and index the sub-documents according to one or more phoneme such that a phoneme can be used as a search key for searching the phoneme in the sub-documents. A system and method may construct a searchable term based on a distance of two or more phonemes identified in a set of phonetic transcriptions.

A system and method may transcribe a textual search term into a set of search phoneme strings based on a respective set of pronunciations, and simultaneously search for the set of search phoneme in the set of phonetic transcriptions. A system and method may include, in a set of search phoneme strings, at least one phoneme string based on a pre-configured distance from the textual search term. A system and method may statistically calculate a probability of a recognition error for a phoneme; and based on relating a fuzziness parameter value to the probability, select to include or exclude a phonetic transcription in a result of searching for an element in the set of phonetic transcriptions. A system and method may statistically calculate a probability of a recognition error for a phoneme; and based on relating a fuzziness parameter value to the probability, select to include the phoneme in the set of search phoneme strings.

A system and method may transcribe a textual search term into a set of search phoneme strings and use the set of search phoneme strings to conduct a set of searches. A system and method may identify, in the set of phonetic transcriptions, phonetic transcriptions that include an element that is similar to the searched element. A system and method may use one or more of the search phoneme strings to search for a set of elements in the set of phonetic transcriptions; and identify, in the set of phonetic transcriptions, phonetic transcriptions that include a sub-set of elements included in a set of elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 6 shows a set of test results related to prior art and to illustrative embodiments of the present invention.

Figure 1:
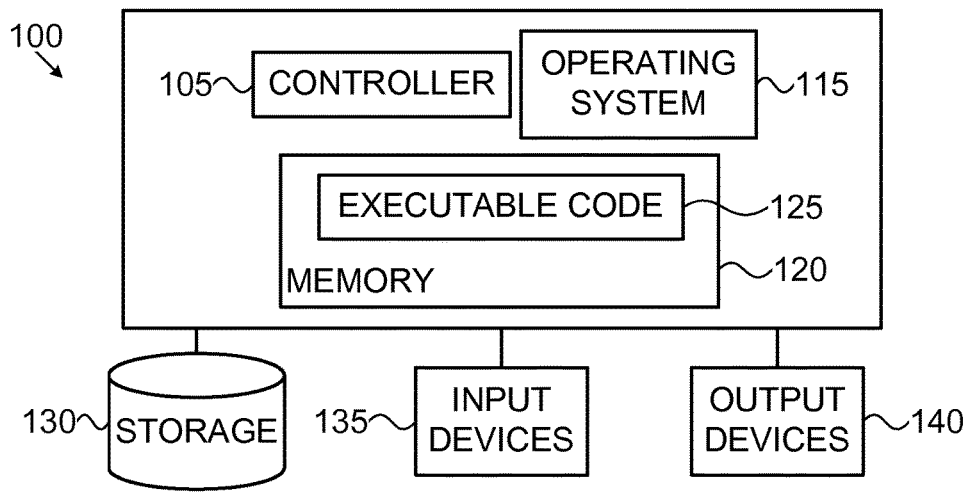
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to illustrative embodiments of the present invention. Computing device 100 may include a controller 105 that may be, for example, a central processing unit processor (CPU), a chip or any suitable computing or computational device, an operating system 115, a memory 120, an executable code 125, a storage system 130, input devices 135 and output devices 140. Controller 105 may be configured to carry out methods described herein, and/or to execute or act as the various modules, units, etc. More than one computing device 100 may be included, and one or more computing devices 100 may act as components of a system, for example phonetic indexing unit 215 and indexing unit 220 may each be a computing device similar to computing device 100. For example system 200 described herein may be, or may include components of, computing device 100. For example, by executing executable code 125 stored in memory 120, controller 105 may be configured to carry out a method of searching for an element in speech related documents as described herein. For example, controller 105 may be configured to produce a set of phonetic transcriptions by transcribing a set of digital (or electronic) speech recordings speech recordings to a set of digital or electronic phoneme strings and including the phoneme strings in the set, revers-index the digital phonetic transcriptions according to one or more digital phonemes, transcribe a textual digital search term into a set of digital search phoneme strings, and use the set of search phoneme strings to search for an element in the set of phonetic transcriptions as described herein.

As referred to herein, speech recordings, phoneme strings, phonetic transcriptions, elements of speech, search key and textual search term may all be digital or electronic objects or entities. For example, each of: speech recordings, phoneme strings, phonetic transcriptions, elements of speech, search key and textual search term may be, or may be included in a file or in a memory (e.g., in memory 120 or in a file stored on storage system 130). For example, a memory segment or a file may be, or may include, a digital representation of a speech recordings, phoneme strings, phonetic transcriptions, elements of speech, a search key and/or a textual search term. A digital representation may be a set of values usable by a computer as known in the art.

Revers-indexing as referred to herein may include analyzing digital content (e.g., digital phonetic transcriptions) to identify digital phonemes or digital elements therein and generating a list, or a set of references, or any other construct that maps digital or digitized phonemes to digital phonetic transcriptions that include the digitized phonemes. For example, revers-indexing a set of digital phonetic transcriptions may include identifying all phonetic transcriptions that include the (or a digital representation of) phoneme "you" and storing information in a list, or creating references usable for finding all phonetic transcriptions that include the phoneme "you". For the sake of clarity and simplicity, the terms "digital", "digitized" or "electronic" will be omitted from elements such as speech recordings, phoneme strings, phonetic transcriptions, elements of speech, search key and textual search discussed herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that searches for an element in speech related documents as further described herein. Although, for the sake of clarity, a single item of executable code 125 is shown in FIG. 1, a system according to illustrative embodiments of the invention may include a plurality of executable code segments similar to executable code 125 that may be loaded into memory 120 and cause controller 105 to carry out methods described herein. For example, units or modules described herein (e.g., phonetic indexing unit 215 and indexing unit 220) may be, or may include, controller 105, memory 120 and executable code 125. For example, phonetic indexing unit 215 and indexing unit 220 may be or may include a controller 105, memory 120 and executable code 125.

Storage system 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

Some embodiments may be provided in a computer program product that may include a non-transitory machine-readable medium, stored thereon instructions, which may be used to program a computer, controller, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Known or current search platforms or systems are typically designed to search textual data constructed out of word sequences, for example, searching text in transcriptions produced using LVCSR. Phonetic recognition can have a number of advantages over LVCSR. For example, Phonetic recognition typically does not suffer from the OOV problem described above since each and every word is typically constructed of a known set of in-vocabulary phonemes. In addition, phonetic transcription can be much "lighter" procedure compared to LVCSR and therefore can reduce time and/or computational resources in comparison to LVCSR.

However, simply searching for phonetic sequences or strings in a phonetic transcription can be problematic since phonetic transcriptions typically include a lot of recognition errors, e.g., phonemes are replaced, inserted where they don't belong and/or deleted. Accordingly, as known in the art, detection and accuracy rates exhibited by known systems and methods for phonetic search can be low.

As described herein, a system and method according to some embodiments of the invention provide a solution for searching transcriptions that include errors, e.g., transcriptions that include transcription errors as known in the art. For the sake of clarity and simplicity, the Solr platform is mainly discussed herein, however, it will be understood that any search platform may be applicable, used and/or included in a system and method according to some embodiments of the invention. For example, in some embodiments, an Attivio search platform (see https://en.wikipedia.org/wiki/Attivio) or a Vivisimo search platform (see (https://en.wikipedia.org/wiki/Vivisimo) may be used instead of the Solr search platform discussed herein.

As described, a system and method according to some embodiments of the invention include and enable computer based, fast search related to speech recordings. As described, a system and method according to some embodiments of the invention address the OOV computer-centric challenge. As further described, a system and method according to some embodiments of the invention include or enable using a search platform (e.g., Solr) in order to search for phonetic elements in transcriptions even if the search platform is generally unsuitable (or not designed) for phonetic search.

Figure 2:
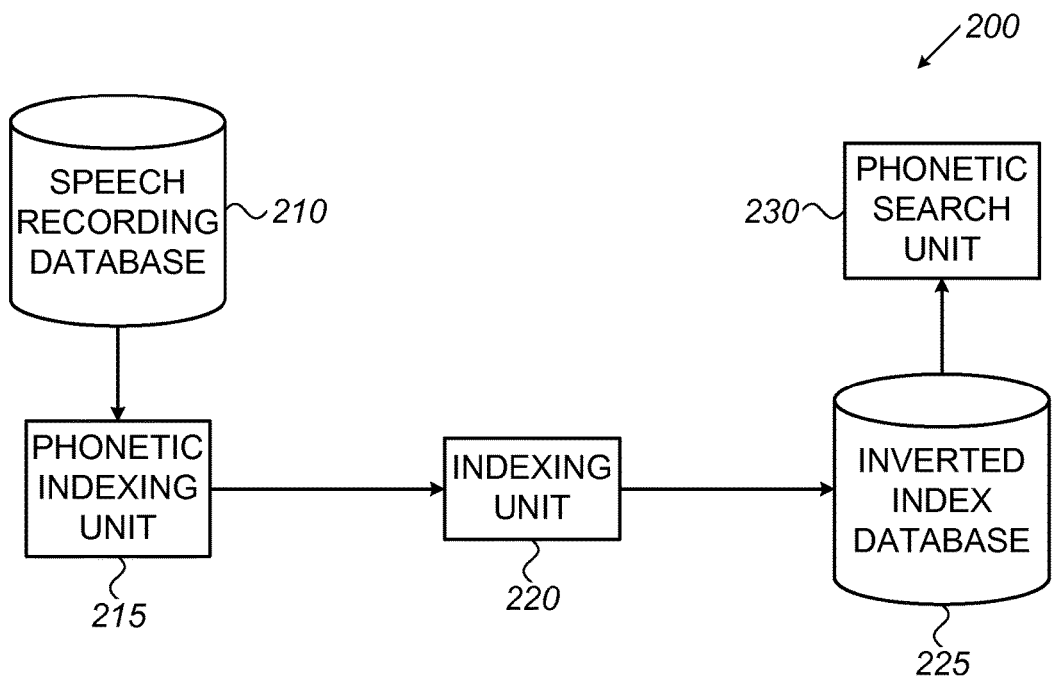
FIG. 2 is an overview of a system and flow according to illustrative embodiments of the present invention.

Reference is made to FIG. 2, an overview of a system 200 and flows according to some embodiments of the present invention. As shown by block 210, a system may include a speech recording database. For example, audio content such as recorded telephone conversations or other recorded audio or speech may be stored, e.g., as files or other digital objects, in a database 210. For example, database 210 may be, may include, or may be operatively connected to, storage system 130. It will be understood that any audio content may be used as input to a system and method according to some embodiments of the invention, accordingly, although terms like "recordings", "recorded call" and "recorded conversation" may be used herein, it will further be understood that any other audio content may be applicable.

A system and method according to some embodiments of the invention include transcribing a set of speech recordings to a set of phoneme strings. A system and method according to some embodiments of the invention may include storing or including phoneme strings in a set of phonetic transcriptions. For example and as shown, a system 200 may include a phonetic indexing unit 215. For example, phonetic indexing unit 215 may be a device similar to computing device 100, e.g., including a processor and memory as described. For example, in some embodiments of the invention, phonetic indexing unit 215 extracts audio content (e.g., speech recordings) from database 210, and/or transcribes the audio content to a string of phonemes. Based on a configuration parameter that includes or indicates acoustic and/or language properties or characteristics, phonetic indexing unit 215 may generate a string of phonemes that match, or best suit, the acoustic and/or language properties of the audio content. In some embodiments, phonetic indexing unit 215 may generate phonetic transcriptions by including phoneme strings in a set of phonetic transcriptions. For example, a set of phoneme strings identified by phonetic indexing unit 215, in a recording of a conversation, may be stored, or included, in a phonetic transcription, e.g., as a file on storage system 130.

According to some embodiments of the invention, a system and method may include indexing phonetic transcriptions according to one or more phoneme such that a phoneme (or set of phonemes) can be used as a search key in order to search for the phoneme (or set of phonemes) in the indexed phonetic transcriptions. For example and as shown, a system 200 may include an indexing unit 220. According to some embodiments of the invention, indexing unit 220 receives phonetic transcriptions (e.g., produced by phonetic indexing unit 215) and inverse-indexes the phonetic transcriptions such that a phoneme or set of phonemes can be searched in the revers-indexed phonetic transcriptions using the phoneme (or using a set of phonemes) as a search key. It will be noted that a term used as a search key or search term may be or may include one or more phonemes.

As known in the art, a traditional database that stores transcriptions of audio content (e.g., transcriptions of conversations) can contain a mapping of a document's identification code (e.g., a conversation transcription ID) to terms in the document. An inverted index or reverse index as referred to herein may be, or may generate, a reverse a mapping, e.g., an indexing or mapping that maps terms to documents as oppose to mapping documents to terms. For example, in some embodiments, each (and possibly every) term in a corpus or set of terms is mapped to a respective set of documents. Accordingly, using an inverted or reversed index created by embodiments of the invention as described, a reverse-index may enable finding all documents (or substantially all documents) that include a term using the term as a search key. In some embodiments, all terms (or substantially all terms) are mapped to one or more documents, and the terms in an inverted index produce by reverse-indexing as describe herein may be sorted in according to a lexicographical order (e.g., sorted in ascending or descending order). A reverse-index, inverted index or reverse index as referred to herein may be a list or other object (e.g., a file in a database) that includes, for each term included in a relevant set of terms, one or more references to one or more documents that include the term.

Indexing or reverse-indexing a set of phonetic transcriptions as described herein may include storing data in a database, e.g., a table in a database and so on. For example, reverse-indexing a set of phonetic transcriptions (or other documents or files) as described herein may include storing, in a storage system or database, data that enables locating a file or document using a textual representation of a phoneme as a search key. Any number of phonetic transcriptions may be revers-indexed by indexing unit 220. For example, a 1-Best transcription or a set of N-Best transcriptions of a recorded conversation may be revers-indexed by indexing unit 220.

1-Best and N-Best can be 1-Best and B-Best sets as are known in the art. Generally, a 1-Best transcription may be a phonetic sequence (or sequence of phonemes) that includes the most probable phonemes in a transcription. For example, each phoneme identified in a transcription may be associated with a confident or probability value that indicates the probability that the phoneme was correctly identified. A 1-Best transcription may be a set of phonemes identified in a transcription with the highest probability or confident level. Other lists, sets or groups of transcriptions may be generated by some embodiments of the invention, for example, the set of least probable transcriptions and so on.

An N-best transcription may be a list of the N most probable phonetic sequences. It is highly possible to have overlapping segments between the N transcriptions, e.g., some phonetic sequences may appear in more than one transcription in the N transcriptions.

As shown by block 225, a system 200 may include a database that stores revers-indexed phonetic transcriptions. For example, if a Solr search platform is used (e.g., phonetic search unit is a Solr based system) then indexing unit 220 may store the revers-indexed phonetic transcriptions in the form of Solr documents as known in the art. As described, the revers-indexed phonetic transcriptions may be generated and/or stored according to a standard, and/or in a form, and/or format, suitable for any other search platform, e.g., according to a format usable by the Attivio or the Vivisimo platforms discussed herein. In some embodiments of the invention, each Solr document in database 225 may represent a specific recording of a specific conversation or interaction. For example, a phoneme may be searched for, in the revers-indexed phonetic transcriptions stored in database 225, by a Solr (or other) search platform. A search result may include a set of recordings or conversations that include a phoneme provided as a search key. As shown, a system 200 may include a phonetic search unit 230. For example, phonetic search unit 230 may be a Solr based phonetic search platform that receives a phrase from a user and performs a phonetic search for all documents in database 225 that include the phrase. Other filters, rules or criteria may be used. For example, any search query supported by a Solr platform as known in the art may be used if phonetic search unit 230 is, or includes, a Solr platform. It will be understood that platforms other than the Solr platform may be used by, or included in, system 200. For example, indexing unit 220 may be configured to store revers-indexed phonetic transcriptions in database 225 such that they are readily searched by any other (possibly conventional, commercial or known) search platform. For example, embodiments of the invention may use any one of the Solr, Attivio or Vivisimo search platforms as described herein.

Figure 3:
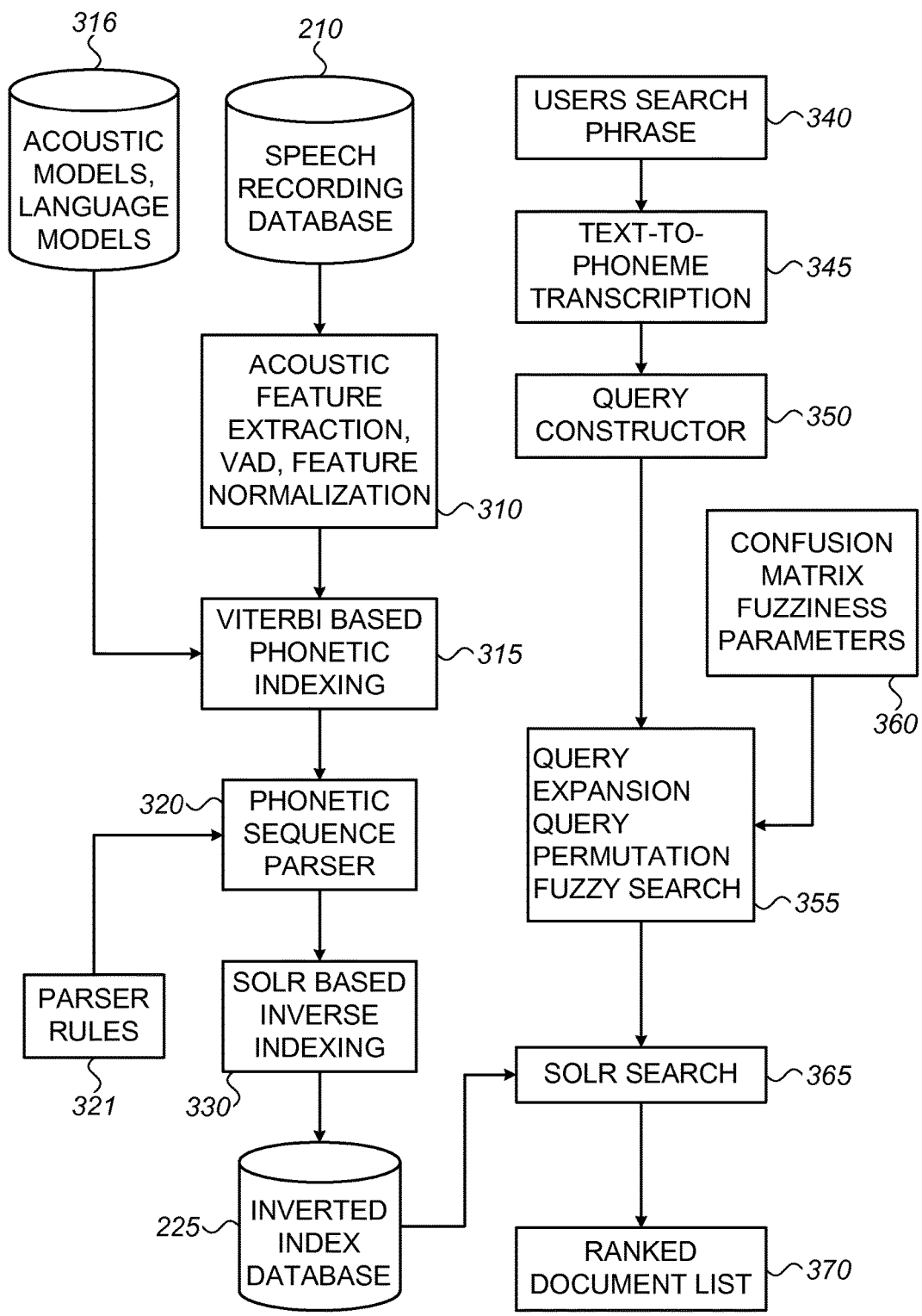
FIG. 3 is an overview of a system and flows according to illustrative embodiments of the present invention.

Reference is made to FIG. 3 which shows an overview of a system and flows according to some embodiments of the present invention. As shown, input to a system, method or flow may come from speech recordings database 210 that may store recordings of interaction and/or conversations, e.g., recorded telephone calls in a call centers. Other content stored in database 210 may come, or be obtained from a microphone, a cellular phone, a web recording or any other system or method for obtaining audio content.

As described, a system and method according to some embodiments of the invention may perform phonetic indexing. For example, phonetic indexing unit 215 may analyze and/or process a set of speech recordings to produce a set of phonetic transcriptions for each recording. Phonetic indexing unit 215 may produce one, considered best, phonetic transcription for a recording, e.g., 1-Best phonetic transcription for an audio content object (e.g., a recoded conversation.) as known in the art. Phonetic indexing unit 215 may produce a set of phonetic transcriptions for a recording, e.g., create N-Best phonetic transcriptions for a recoded telephone call.

In order to phonetically index a set of documents and as shown by block 310, phonetic indexing unit 215 may extract acoustic features from the set of documents. An acoustic feature as referred to herein may be any acoustic property of an audio signal, e.g., a speech sound that may be represented by a computing device. For example, an acoustic feature may be recorded and analyzed or processed by a computing device. For example, processing of input audio content by phonetic indexing unit 215 may include extracting mel frequency cepstrum coefficients (MFCC) features from each 25 millisecond frame of an input audio signal, then detecting voice activity (e.g., using a voice activity detector (VAD)), and then performing cepstral mean normalization (CMN) and linear discriminant analysis (LDA) all of which are well known in the art, specifically, in the field of speech and audio analysis and processing. Accordingly, phonetic indexing unit 215 may produce a set of normalized feature vectors that represents relevant properties of input audio content or signal. For example, phonetic indexing unit 215 may produce a set of normalized feature vectors that represent and enable to identify speech frames in an input audio signal. As shown, phonetic indexing unit 215 may use Acoustic and language models 316. For example, Acoustic and language models may be trained and evaluated on a training dataset as known in the art. Acoustic and language models 316 may include or represent a probability density function for (or of, or associated with) acoustic features of all phonemes. Acoustic and language models 316 may include or represent a probability of any tri-phone to appear in some context.

For example, phonetic indexing unit 215 may use acoustic and language models 316 to create, generate and/or produce phonetic indexing. For example and as shown by block 315, phonetic indexing unit 215 may use the known in the art viterbi phone recognizer in order to decode a signal. In some embodiments, phonetic indexing unit 215 may use a triphone acoustic hidden Markov models and 3-gram language model in the decoding process. Accordingly, phonetic indexing unit 215 may generate a phoneme or phonetic lattice that can be reduced to a 1-Best phoneme string or a set of N-best phoneme strings.

A phoneme or phonetic lattice is known in the art, for example, a phonetic lattice may be a directed acyclic graph (e.g., as described in http://en.wikipedia.org/wiki/Deterministic_acyclic_finite_state_automaton), which represents, records and/or provides the probability of each phoneme to be output at a certain time. Accordingly, using a phoneme or phonetic lattice produced as described, sub-words, words and/or phrases may be assigned, or associated with, a certainty value, a probability value or a score or rank value. For example, a phonetic lattice may include all possible tracks of phonetic transcriptions for an audio file provided as input and, using the probabilities of words and/or phrases, a probability for each track may be calculated.

Indexing unit 220 may reverse-index a set of transcriptions. For example, indexing unit 220 may tokenize a string of phonemes into one or more phoneme tokens (terms), and may construct an inverse index that maps a set of documents (e.g., recorded conversations) to tokens. For example, to invert or reverse an indexing of a set of recordings, indexing unit 220 may use any parsing rules or criteria (321) when inverting an index of a set of transcriptions. A user may select a rule or criteria and indexing unit 220 may reverse-index a set of transcriptions based on a rule received from a user (e.g., stored as shown by block 321).

For example and as shown by block 320, indexing unit 220 may parse transcriptions into searchable terms and/or use the terms in order to index the transcriptions. In some embodiments, indexing unit 220 may use the single phoneme approach. For example, indexing unit 220 may tokenize a string of phonemes into single phoneme tokens (terms), e.g., a transcription of, or that includes "A B C D" may be tokenized into four terms, e.g., Trem1: "A", Trem2: "B", Trem3: "C", and Trem4: "D".

In some embodiments, indexing unit 220 may use the K-phonemes (multiple phonemes) sequence approach. For example, indexing unit 220 may tokenize a phonetic transcription into a set of K-phonemes terms with K−1 phonemes overlap. For example, for K equals 3, a transcription of, or that includes "A B C D E" may be tokenized into 3 terms, e.g., Trem1: "ABC", Trem2: "BCD" and Trem3: "CDE". Of course, indexing unit 220 may use any value for K, e.g., based on input or selection of a user. Accordingly, any value for the overlap, e.g., K−1 or even zero ("0") may be used.

As shown by block 330, indexing unit 220 may inverse index a set of transcriptions. For example, indexing unit 220 may invert-index or reverse-index a set of transcriptions such that a term may be searched for, in the set of transcriptions, by a Solr based platform. An inverted index created by indexing unit 220 may be a list or other object that maps each (and every) term (whether it's a single phoneme or K-phonemes) to all documents in which it appears. Indexing unit 220 may create an inverted index or reverse-index in which terms are mapped to one or more documents, and the terms in the inverted index are sorted in ascending or descending lexicographical order, for example, an inverted index is a mapping of terms to a recording and/or to any object related to the recording (e.g., to a phonetic transcription of the recording). Accordingly, a mapping of terms to recordings may be produced by indexing unit 220. As shown, reverse-indexed transcriptions may be stored, e.g., as Solr documents, in database 225. For example, database 225 may include the map between terms and their reference list or a mapping of terms to the Solr documents in which they appear. Accordingly, a term (e.g., a phoneme string) may be used as a search key in order to find, in database 225, all the documents that include the term.

Some embodiments of the invention enable using a search platform for performing a phonetic search. For example, a Solr based search platform may be used for performing a phonetic search. A system and method may receive, e.g., from a user or application, a search request or a search query that includes a term. A response to a search query or request may be or may include a set or list of documents, transcriptions and/or recordings. For example, a supervisor in a call center may want to know in which conversations or calls the word "vacation" or the phrase "travel to Paris" were mentioned, in response to a query that includes the word and phrase of interest, a system and method according to some embodiments of the invention may return to the supervisor a list of some or all conversations in which vacation, and traveling to Paris were mentioned.

In some embodiments, searching for a term (indicated in a search query) in a transcription or text document may be conducted by parsing the search query into terms (e.g., using single phonemes or K-phonemes) and searching of some or all of the identified terms. For example, a query processing unit that may be, or may include components of computing device 100, may parse a search query into terms and/or may search for each of the terms in an inverse indexed set of transcriptions produced as described herein. In some embodiments, a list of documents or recordings or conversations in which at least one of the terms identified in a query may be sorted, e.g., according to relevancy. For example, a system may rank documents according to a relevancy to a term and/or sort the documents according to their ranks.

As shown by block 340, a user may enter a phrase to be searched for in a set of documents, e.g., searched for in a set of recordings. A phrase received from a user as shown by block 340 may be in any desired length (e.g., between 5 to 25 phonemes). Any number of words may be included in a search phrase and any word may be searched for as described. It is noted that no OOV limitations exist using a system and method according to some embodiments of the invention.

A system and method may transcribe a textual search term into a set of search phoneme strings. For example, and as shown by block 345, a search phrase may be translated or converted into a set of phonemes, e.g., using text-to-phoneme (TTP) as known in the art. For example, a query processing unit may use a pronunciation dictionary, if one exists for a search phrase, or it may use a joint-multigram model or other letter-to-sound rules in order to convert a search phrase into a set of phoneme.

As shown by block 350, a query constructor unit may constructs the Solr (or other search platform) based query. For example, a query constructor unit may parse the query phonetic sequence using the same method used for indexing as described herein (e.g., using single phonemes or K-phonemes). For example, a query constructor unit may construct a Solr query by inserting a parsed phoneme sequence into search string in a query's class. In order to achieve precise and accurate results, a query constructor unit may use the "AND" and "NEAR" operators supported by a target or used search platform, requiring that all phoneme terms appear in the searched document in very close proximity to each other. For example, if a Solr based search platform is used then a user may use other Solr search features (e.g., filter by date or some other criteria, choose how many document to retrieve etc.).

As shown by block 355, a system and method may include query expansion, query permutation and fuzzy search. A query permutation may generally include modifying a query or a search term to produce a set of queries or set of search phoneme strings. As shown by block 360, confusion matrix and fuzziness parameters may be used in order to expand a query or perform query permutation and fuzzy search. Generally, confusion matrix, fuzziness parameters may be used to allow some form of error (or distance) between a searched phrase and the phonetic transcription that include the phrase or that include phrases which are close (or similar) to the searched phrase.

For example, some phonemes in a phonetic transcription may be misrecognized during a phonetic indexing procedure. A phonetic confusion matrix may be constructed by statistically calculating the probability of each recognition error to occur. The matrix may be created and/or updated using a training dataset (e.g., a set of speech recordings). For example, a confusion matrix may be trained or updated using transcriptions of relevant audio content, e.g., audio related to the same language, vocabulary or accent and as in the speech recordings in database 210. A Fuzziness parameter may be a value that sets or determines the degree of error (distance) the user allows between the searched phrase and the indexed transcription.

An initial query construction may include, or be based on, an exact match between the searched phrase phonetic sequence and the indexed transcription phonetic sequences. However searching an "exact match" to the query's set of phonemes may result in very low recall since the phonetic index may contains some errors and phoneme misrecognitions.

Embodiments of the invention may provide and/or enable high precision and a quick, agile search using fuzzy search, query permutation and query extension as further described.

With regard to fuzzy search, phonetic transcriptions may contain recognition errors of three kinds: insertion, deletion, and substitution. A search platform such as Solr provides the ability to search using different types of "fuzzy matching" queries, meaning it has the ability to perform inexact matches of terms and term sets to documents in an index.

A system and method according to some embodiments of the invention may use the inexact matching ability of a search platform to include, in a result, documents that do not include a search term but include terms that are close to the search term, thus expanding the set of documents found in a search.

If a match is found between a query phoneme set and a set of searched documents while insertions are allowed, it may mean that all phonemes in the query were found, and the phonemes are in the right order, and close to each other (to an extent determined by the selected fuzziness level \ fuzziness parameters). For example, a selected fuzziness "level", which determines the extent of insertion allowed for a search phrase is controllable by a parameter provided to Solr (fuzziness parameters). A fuzziness "level" or value may be selected by a user or it may be automatically selected, by a query constructor unit such that it is tied, or proportional to, the number of phonemes in a search phrase.

Based on a single query, a query constructor unit may construct a number of queries by including different permutations of a phoneme sequence provided by a user in respective different permutations of a query. Creating a number of queries based on a set of permutations of a query search term may be referred to herein as query permutation.

Query permutation and query extension are further described below. After transcribing the searched phrase with the TTP, a query constructor unit may find the most probable M permutations of the phoneme sequence as it might appear in the indexed transcription set. A set of M permutations may then be searched in parallel and the resulting documents may be combined into a single list provided as a result to a user.

The advantages of expanding a query may include an increased recall rate (increase in the number of documents found), since expanding a query allows some form of substitution and deletions errors but may still maintain both high precision and high search speed, due to the fact that only high probability permutations of the original query search for high probability permutations of the original query are used (e.g., included in the M permutations).

In some embodiments, query permutation and a fuzzy search may be combined in order to increase detection rates. For example, a query constructor unit may receive a fuzziness parameter and a permutation value (e.g., M, the number of query permutations discussed above) and use both in order to control the fuzziness of a search and the number of permutations used. Accordingly, by providing the fuzziness parameter and a permutation value, a user may control the tradeoff between recall, precision and runtime.

A system and method may use a set of search phoneme strings to search for an element in a set of phonetic transcriptions. An element in a set of phonetic transcriptions may be a textual term, a phoneme string and the like. As shown by block 365, a query is sent to a search platform that may use the query in order to search for a term in documents stored in database 225. For example, a number of queries resulting from a permutation process as described may be provided or sent to a Solr system and the Solr system may search for a term in the queries in documents stored in database 225. The queries sent to a Solr or other system may be expanded queries, e.g., queries into which terms were added.

As shown by block 370, a search platform may return a list of documents wherein the list may be sorted or the documents may be ranked. For example, Solr provides ranking of results that may be used. In some embodiments, a phonetic ranking may be implemented such that a ranking of documents found is according to a match of their content with a phoneme. For example, as described, a textual term received from a user as a search key may be converted to a phoneme and the phoneme may be searched. A ranking unit may rank documents found based on a matching of the content in the documents to the phoneme used in the search.

Some modifications of the flow described with respect to FIG. 3 may be used in order to better use abilities or features of a Solr based system and produce a faster search. For example, inverse indexing or reverse indexing as shown by block 330 and described herein may be done by indexing unit 220 by indexing the terms (single phonemes or K-phonemes) in sub-documents of 20-100 sequential terms in each sub-document and a 50% overlap between sub-documents.

To construct a query as shown by block 350, a query constructor unit may first parse a query's phonetic sequence using the same method used for indexing (single phonemes or K-phonemes). A Solr query may be constructed by inserting the parsed phoneme sequence to the search string of the query class. In an alternative search approach, a query constructor unit may use (e.g., insert into a Solr query) operators such as the "AND" and "OR" operators, requiring that all or any of the phoneme terms appear in a searched sub-document. According to some embodiments, ranking of results may be based on the number of terms found in a sub-document, e.g., the more terms found in a sub-document and in closer proximity, the higher the rank of the document.

Searching as shown by block 365 may be performed on sub-documents instead of on full or entire documents, if the search term or phoneme is found in a sub-document, the sub-document may be marked as a hit, e.g., by including a reference to the sub-document in a list. If a sub-document is marked as a hit, a system and method may return, in a result as shown by block 370, the entire or original document (the document that the sub-document is part of).

To construct a query as shown by block 350, a query constructor unit may first parse a query's phonetic sequence using the same method used for indexing (single phonemes or K-phonemes). A Solr query may be constructed by inserting the parsed phoneme sequence to the search string of the query class. In an alternative search approach, a query constructor unit may use (e.g., insert into a Solr query) operators such as the "AND" and "OR" operators, requiring that all or any of the phoneme terms appear in a searched sub-document. According to some embodiments, ranking of results may be based on the number of terms found in a sub-document, e.g., the more terms found in a sub-document and in closer proximity, the higher the rank of the document.

Searching as shown by block 365 may be performed on sub-documents instead of on full or entire documents, if the search term or phoneme is found in a sub-document, the sub-document may be marked as a hit, e.g., by including a reference to the sub-document in a list. If a sub-document is marked as a hit, a system and method may return, in a result as shown by block 370, the entire or original document (the document that the sub-document is part of).

Figure 4:
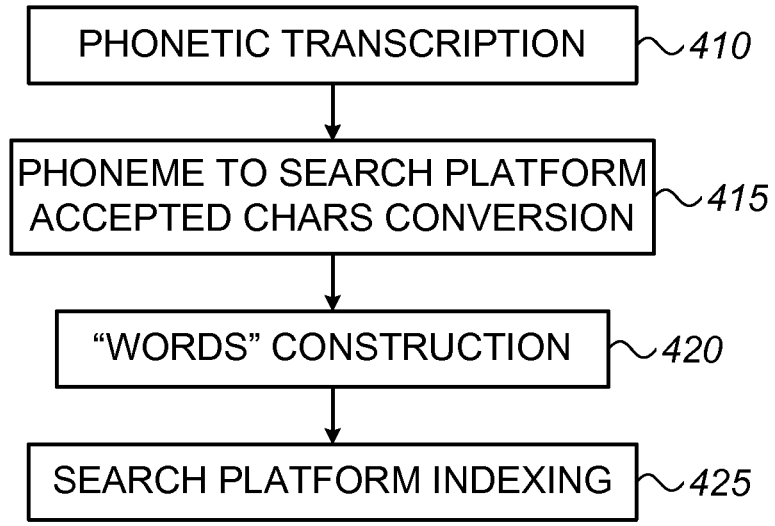
FIG. 4 shows a flowchart of a method according to illustrative embodiments of the present invention.

Reference is now made to FIG. 4 which shows a flowchart of a method according to an embodiment of the present invention. The flow shown in FIG. 4 may be used by embodiments of the invention for indexing a set of documents. As shown by block 410 a phonetic transcription may be used or provided as input. For example, a 1-best phonetic transcription of each interaction in a call center may be used, e.g., a phonetic transcription including phonetic symbols such as "aU @ N p 3 dz . . . ".

As shown by block 415, phonetic symbol strings may be converted to textual terms or elements, e.g., characters (or chars as known in the art). For example, a set of phonetic symbol strings may be converted to elements such as "a f G h J y . . . ". For example, based on the search platform used, phonetic symbol strings may be converted to textual terms usable by the search platform used.

As shown by block 420, words construction may be performed. For example, word construction may include grouping char sequences to "words", each word containing k-phonemes, with K−1 overlap. These words can be searched using tools of a search platform such as Solr. For example, using k=5, grouping of the elements "a f G h J y . . . " may produce the words "afGhJ", "fGhJy" and so on.

As shown by block 425, indexing for a search platform may be performed. For example, the resulting words as described with reference to block 420 may be "word" sequences that are in a format that can be easily processed, parsed and/or indexed using a Solr platform.

Figure 5:
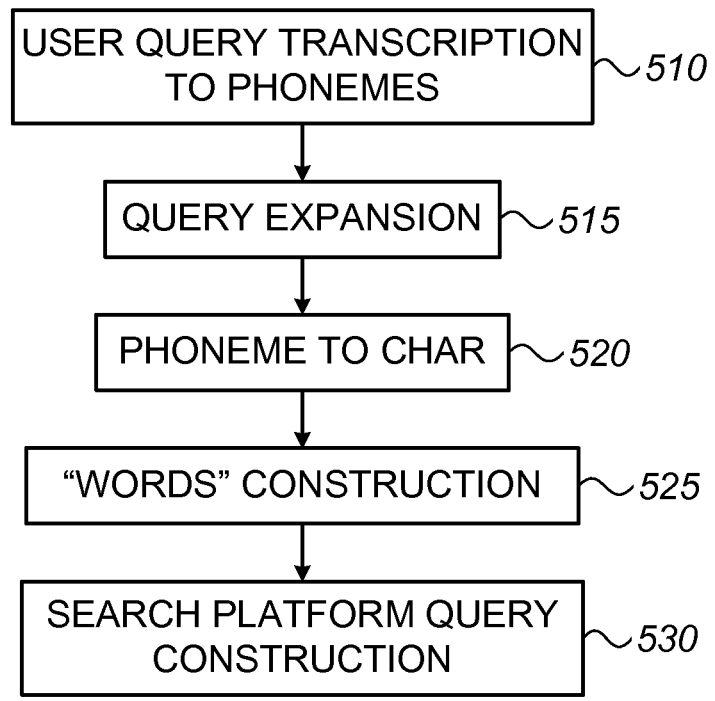
FIG. 5 shows a flowchart of a method according to illustrative embodiments of the present invention.

Reference is now made to FIG. 5 which shows a flowchart of a method according to an embodiment of the present invention. The flow shown in FIG. 5 may be used by embodiments of the invention for searching for a term or element in a set of documents.

As shown by block 510, a query may be transcribed into one or more phoneme. For example, text in a search query received from a user may be transcribed into a set of phonemes as described herein. For example, a user's query that includes "Account" as an input phrase to be searched for may be transcribed, e.g., by a query constructor unit, into a sequence of phonemes such as "@ k aU n t". For example, a query constructor unit may use a TTP component or method in order to transcribe text in a query to a set of phonemes.

As shown by block 515, a query may be expanded. For example, a confusion matrix may be used (by a query constructor unit) to expand a single text or phoneme element, string or sequence in a query into a number (e.g., M) different sequences, elements, strings or terms. In some embodiments, based on a confusion matrix, a single phonetic sequence is expanded, by a query constructor unit, into M different high probability sequences. For example, a query constructor unit may expand the sequence "@ k aU n t" into the set of sequences "{ k aU n t", "@ k aU n=t", "eI k aU n t". Accordingly, a system may receive a query from a user that includes the sequence, term or element of "@ k aU n t" and search for a set of sequences that includes the sequences "{ k aU n t", "@ k aU n=t", "eI k aU n t". A system 200 may present to a user results of searching for an expanded query.

By automatically and/or autonomously expanding a query as described, a system and method according to some embodiments of the invention enable finding documents that contain relevant elements (e.g., words or phrases) in transcriptions of recorded conversations even if the transcriptions include errors as discussed.

As shown by block 520, phonemes in a query or in an expanded query may be converted into characters (or chars as known in the art). According to some embodiments of the invention, phonemes in a query or in an expanded query may be converted into any format that is suitable for a target search platform. For example, if a Solr search platform is used then phonemes in a query are converted into chars since characters are the native format for Solr. For example, a query constructor unit may convert a set of phonemes in a query into the set of "a f G h J" characters.

As shown by block 525, words may be constructed from character sequences. For example, a query constructor unit may use a configuration parameter K that defines the number of phonemes to be grouped into a word and may group characters sequences into words that include K-phonemes, possibly with K−1 overlap, e.g., as described herein with respect to in indexing. For example, a query constructor unit may construct the word "afGhJ" from the set of characters "a f G h J".

As shown by block 530, a search platform specific query may be constructed. For example, a query constructor unit may use a set of M words constructed as described with reference to block 525 to construct a search query that can be provided or sent to, and used by, a Solr based system. In some embodiments, to construct a query for a specific search platform, a query constructor unit may add terms operators to a query, remove terms operators from a query, or modify terms and operators in a query. For example, a query constructor unit may add to a query boolean operators (e.g., "AND" and "OR" operators), proximity operators (e.g., "NEAR") or grouping operators (e.g., "( )") to a query string.

Reference is now made to FIG. 6 which shows a table 600 that includes a set of test results related to a prior art system (a Solr based search platform) and to a system according to some embodiments of the present invention. Specifically, the table in FIG. 6 shows statistics for four different systems: a Solr search over LVCSR (row 610, Solr_LVCSR) used as reference (this system does not support on Out Of Vocabulary phrases); a "standard" phonetic search (row 615, standard_search) tested for reference (this is a known in the art method for phonetic search, without using Solr); a Solr based fuzzy search (using Single phoneme indexing) according to some embodiments of the invention (row 620, Solr_fuzzy 1); a Solr based fuzzy search with query permutation (row 625, Solr_permutation) and a Solr based fuzzy search (using K-phoneme indexing) according to some embodiments of the invention (row 630, Solr_fuzzy 2).

Precision in table 600 is the fraction of retrieved documents that were relevant to a search key. Recall in table 600 is the fraction of relevant to the search documents that were retrieved by a system. Precision and recall were derived by comparing results obtained over the automatic transcription to those obtained over manual transcription. "Document retrieval time" in table 600 is a measure of systems' runtime performance, it is the average time for searching a query over a database of 100,000 conversations and retrieving the highest ranked 1000 documents.

Figure 7:
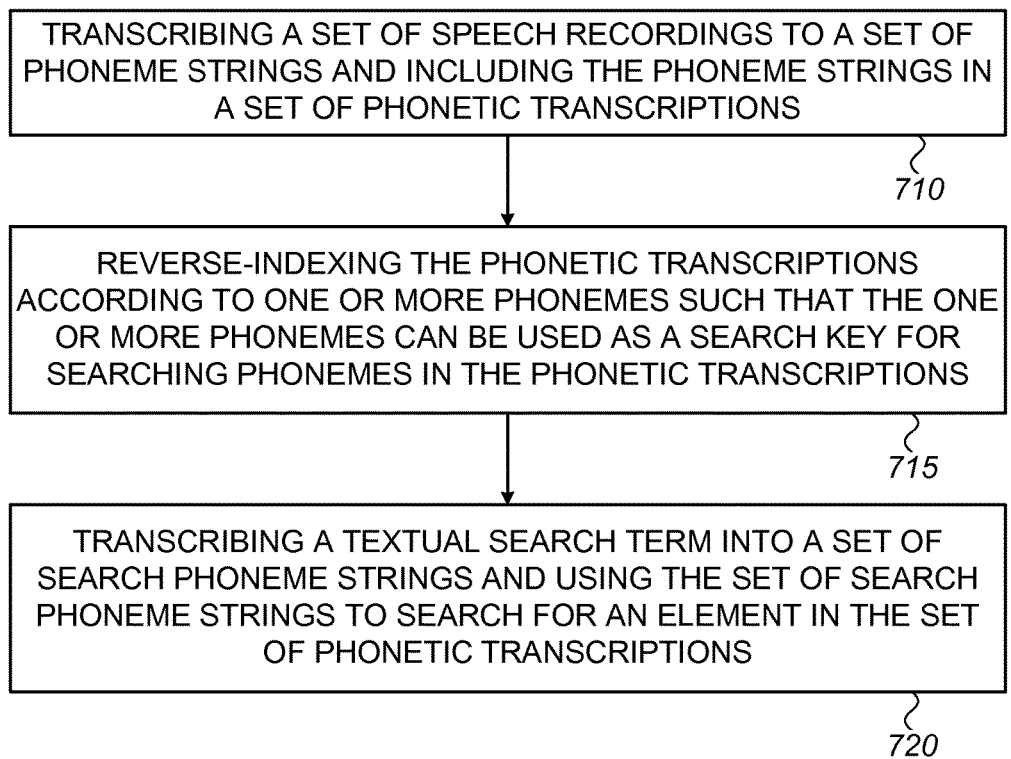
FIG. 7 shows a flowchart of a method according to illustrative embodiments of the present invention.

Reference is now made to FIG. 7 which shows a flowchart of a method according to an embodiment of the present invention. As shown by block 710, a set of speech recordings may be transcribed to a set of phoneme strings and/or the phoneme strings may be included in a set of phonetic transcriptions, for example, by phonetic indexing unit 215. Accordingly, a system and method may transform digital objects or data such as speech recordings into a set of other digital objects, e.g., phoneme strings and include the transformed digital objects in digital container objects, e.g., a set of phonetic transcriptions.

A system and method according to some embodiments of the invention may produce, create, generate and/or provide more than one phonetic transcription for a single or input audio content object. For example, indexing unit 220 may create a set of N-Best phonetic transcriptions for, or based on, a single input speech recording. Reverse indexing as described herein may include inverse indexing the N-Best phonetic transcriptions, e.g., by indexing unit 220, based on one or more terms to produce a set of N phonetic transcriptions searchable using the on one or more terms as search terms or search key.

As shown by block 715, the phonetic transcriptions may be reverse-indexed according to one or more phonemes such that the one or more phonemes can be used as a search key for searching for phonemes in the phonetic transcriptions. For example, indexing unit 220 may reverse-index a set of phonetic transcriptions as described herein.

According to some embodiments of the invention, reverse-indexing a set of phonetic transcriptions may be according to searchable terms found or identified in the set of phonetic transcriptions. For example, searchable terms may be words, phrases or other elements. Searchable terms may be found in the set of phonetic transcriptions or they may be constructed based on the set of phonetic transcriptions. For example, indexing unit 220 may receive a proximity index parameter or value that indicates a distance of a first phoneme from a second phoneme and/or may produce, in a search result, a list of phonetic transcriptions (or their respective conversations) in which the first phoneme and second phoneme are found at a distance no less than the proximity index or value.

A system and method according to some embodiments of the invention, may process a set of phonetic transcriptions prior to reverse-indexing the set of phonetic transcriptions. For example, based on knowledge of possible errors (e.g., OOV or other errors), a phoneme string may be removed from the set of phonetic transcriptions and/or a phoneme string may be added to the set of phonetic transcriptions. For example, a set of phonemes included in a set of phonetic transcriptions and further known to be produced due to an OOV error or other error may be removed in a pre-processing stage that may be performed before inverting an indexing of a set of phonetic transcriptions. Accordingly, a system and method according to embodiments of the invention may generate data (e.g., a list, a set of references etc.) usable for searching for a phoneme in a set of phonetic transcriptions.

As shown by block 720, a textual search term may be transcribed or converted into a set of search phoneme strings and/or the set of search phoneme strings may be used to search for an element in the set of phonetic transcriptions. For example, an element searched for may be a word or phrase. Accordingly, a system and method may transform digital objects or data such as textual search term into a set of other digital objects, e.g., phoneme strings.

A system and method according to some embodiments of the invention, may transcribe a textual search term into a set of search phoneme strings based on a respective set of properties, attributes or characteristics. For example, a query constructor unit may transcribe a textual search term into a set of search phoneme strings based on a configuration parameter or value that indicates a pronunciation, vocabulary, accent and the like. A set of search phoneme strings constructed based on a textual search term received in a query may be searched for, simultaneously, concurrently or at the same time. For example, a search as shown by block 365 may include searching, in parallel, for a set of phoneme strings where the set of phoneme strings is constructed by a query constructor unit based on a single search term received from a user.

A system and method according to some embodiments of the invention may construct a set of search phoneme strings for a search term by including, in the set of search phoneme strings, at least one phoneme string based on a pre-configured distance from the textual search term. For example, a table, list or matrix may include a set of terms and the distances between the terms. For example, in a table, the distance between "cat" and "bat" is smaller than the distance between "cat" and "rug". Accordingly, using a distance configuration value and when finding the word "cat" in a search term received from a user, a query constructor unit may add the word "bat" to a set of search phoneme strings but may not add the word "rug" to the set. A distance configuration value may be received from a user or application.

Accordingly, a system and method according to some embodiments of the invention may improve a search by enabling a user to determine a fuzziness level. For example, a recognition error for a phoneme may be statistically measured, calculated or determined and based on relating a fuzziness parameter or value to the probability, a system and method may select to include a phoneme in a set of search phoneme strings or to exclude the phoneme from the set. For example and as described above, based on a user's selection of a fuzziness value, the word "bat" may be added to a search term and accordingly, conversations where both cat and bat were mentioned may be included in a search result.

A system and method according to some embodiments of the invention may construct a set of search phoneme strings for a search term and/or use the set of search phoneme strings to conduct a set or number of searches. For example, a set of three search phoneme strings may be constructed based on a single or input search term, e.g., using different fuzziness values or using query expansion as described and the three, different search phoneme strings may each be used as input to a search platform. Accordingly, a number of permutations of a single or input search term may be searched for thus increasing recall rate, e.g., as shown by table 600. The number of permutations or search phoneme strings constructed by a system and method may be based on a configuration value received from a user.

According to some embodiments of the invention, pre-processing of a set of set of set of phonetic transcriptions may include dividing, e.g., by an indexing unit, the set of set of phonetic transcriptions into a number of short sub-documents. The set of sub-documents may then be reverse indexed according to one or more phonemes such that a phoneme can be used as a search key for searching the phoneme in the sub-documents, e.g., by reverse indexing a set of any documents as described herein.

Dividing, the set of set of phonetic transcriptions into a number of short sub-documents may enable a number of advantages. For example, a faster search may be enabled by searching a number of sub-documents. In some cases, fuzziness as described herein may not work well with large documents (e.g., since the accuracy may be very low thus producing may false detections). However, using smaller sub-documents as described, a system and method according to some embodiments may search terms in sub-documents (e.g., documents containing around 50 terms). For example, a system and method according to some embodiments may search for terms in sub-documents with no regard to order or proximity. In addition, using sub-documents, a system and method according to some embodiments may retrieve, search and/or return as a result only the relevant part of a conversation. For example, based on sub-documents as described, rather than returning an entire transcription of a conversation, a system and method according to some embodiments may return a small transcription to a user where the small transcription includes the term the user is interested in.

A system and method according to some embodiments of the invention may statistically calculate a probability of a recognition error for a phoneme, and, based on relating a fuzziness parameter value to the probability, select to include a phonetic transcription in a result of searching for an element in the set of phonetic transcriptions or select to exclude a phonetic transcription from a result of searching for the element in the set of phonetic transcriptions. For example, a large fuzziness parameter value may cause a system and method to include phonetic transcriptions that include words that are similar to a word in a search term in a list of transcriptions provided as a result while a small fuzziness parameter value may cause a system and method to exclude such transcriptions from a list. Accordingly, a user may set the level of matching accuracy of a search process.

A search may be refined by a user. For example, based on input from a user, a system and method according to some embodiments of the invention may provide a list of phonetic transcriptions that include a sub-set of elements included in a set of elements in a search query. In another case or based on an alternative configuration, a system and method according to some embodiments of the invention may provide a list of phonetic transcriptions that include all elements in a query.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computerized-method of searching for an element in speech related documents, the method comprising:
   transcribing, by a controller, a set of digital speech recordings stored in a speech recording database to a set of digital phoneme strings and including the phoneme strings in a set of digital phonetic transcriptions;
   reverse-indexing, by the controller, using one or more parser rules, the phonetic transcriptions according to one or more phonemes and storing the reverse-indexed transcriptions in an inverted index database including a mapping to documents such that the one or more phonemes can be used as a search key for searching in the phonetic transcriptions for a phoneme string;
   transcribing, by the controller, a textual search term into a set of search phoneme strings; and
   using, by the controller, the set of search phoneme strings to search for the textual search term in the set of phonetic transcriptions and produce a list of the documents ranked according to the match of the phoneme strings to the documents.

2. The method of claim 1, comprising, prior to reverse-indexing the phonetic transcriptions, performing at least one of:
   removing a phoneme string from the set of phonetic transcriptions, and
   replacing a phoneme string in the set of phonetic transcriptions.

3. The method of claim 1, comprising:
   producing N-Best phonetic transcriptions based on an input speech recording; and
   inverse indexing the N-Best phonetic transcriptions to produce a set of N phonetic transcriptions searchable using the textual search term.

4. The method of claim 1, comprising:
   dividing the set of phonetic transcriptions into a plurality of short sub-documents; and
   indexing the sub-documents according to one or more phonemes such that a phoneme can be used as a search key for searching in the sub-documents for the phoneme.

5. The method of claim 1, comprising constructing a searchable term based on an index proximity of two or more phonemes identified in the set of phonetic transcriptions.

6. The method of claim 1, comprising:
   transcribing the textual search term into a set of search phoneme strings based on a respective set of pronunciations, and
   simultaneously searching for the set of search phoneme strings in the set of phonetic transcriptions.

7. The method of claim 1, comprising including, in the set of search phoneme strings, at least one phoneme string based on a pre-configured distance from the textual search term.

8. The method of claim 1, comprising:
   statistically calculating a probability of a recognition error for a phoneme; and
   based on relating a fuzziness parameter value to the probability, selecting to include or exclude a phonetic transcription in a result of searching for an element in the set of phonetic transcriptions.

9. The method of claim 1, comprising:
   statistically calculating a probability of a recognition error for a phoneme; and
   based on relating a fuzziness parameter value to the probability, selecting to include the phoneme in the set of search phoneme strings.

10. The method of claim 1, comprising, transcribing the textual search term into a set of search phoneme strings and using the set of search phoneme strings to conduct a set of searches.

11. The method of claim 1, comprising, identifying, in the set of phonetic transcriptions, phonetic transcriptions that include an element that is similar to the searched element.

12. The method of claim 1, comprising:
   using the set of search phoneme strings to search for a set of elements in the set of phonetic transcriptions; and
   identifying, in the set of phonetic transcriptions, phonetic transcriptions that include a sub-set of elements included in a set of elements.

13. A system of searching for an element in speech related documents, the system comprising:
   a non-transitory memory; and
   a hardware controller configured to:
      transcribe a set of speech recordings stored in a speech recording database to a set of phoneme strings and include the phoneme strings in a set of phonetic transcriptions,
      reverse-index, using one or more parser rules, the phonetic transcriptions according to one or more phonemes, and store the reverse-indexed transcriptions in an inverted index database including a mapping to documents such that the one or more phonemes can be used as a search key for searching in the phonetic transcriptions for a phoneme string,
      transcribe a textual search term into a set of search phoneme strings, and
      use the set of search phoneme strings to search for an element in the set of phonetic transcriptions and produce a list of the documents ranked according to the match of the phoneme strings to the documents.

14. The system of claim 13, wherein the controller is configured to, prior to reverse-indexing the phonetic transcriptions, performing at least one of:
   removing a phoneme string from the set of phonetic transcriptions, and
   replacing a phoneme string in the set of phonetic transcriptions.

15. The system of claim 13, wherein the controller is configured to:
   produce N-Best phonetic transcriptions based on an input speech recording; and
   inverse index the N-Best phonetic transcriptions to produce a set of N phonetic transcriptions searchable using the textual search term.

16. The system of claim 13, wherein the controller is configured to:
   divide the set of phonetic transcriptions into a plurality of short sub-documents; and
   index the sub-documents according to one or more phonemes such that a phoneme can be used as a search key for searching in the sub-documents for the phoneme.

17. The system of claim 13, wherein the controller is configured to construct a searchable term based on an index proximity of two or more phonemes identified in the set of phonetic transcriptions.

18. The system of claim 13, wherein the controller is configured to:
   transcribe the textual search term into a set of search phoneme strings based on a respective set of pronunciations, and
   simultaneously search for the set of search phoneme strings in the set of phonetic transcriptions.

19. The system of claim 13, wherein the controller is configured to include, in the set of search phoneme strings, at least one phoneme string based on a pre-configured distance from the textual search term.

20. The system of claim 13, wherein the controller is configured to:
   statistically calculate a probability of a recognition error for a phoneme; and
   based on relating a fuzziness parameter value to the probability, select to include or exclude a phonetic transcription in or from a result of searching for an element in the set of phonetic transcriptions.

* * * * *